No. 890,585. PATENTED JUNE 9, 1908.
W. B. FOX.
BEET HARVESTER.
APPLICATION FILED AUG. 17, 1906.
4 SHEETS—SHEET 1.
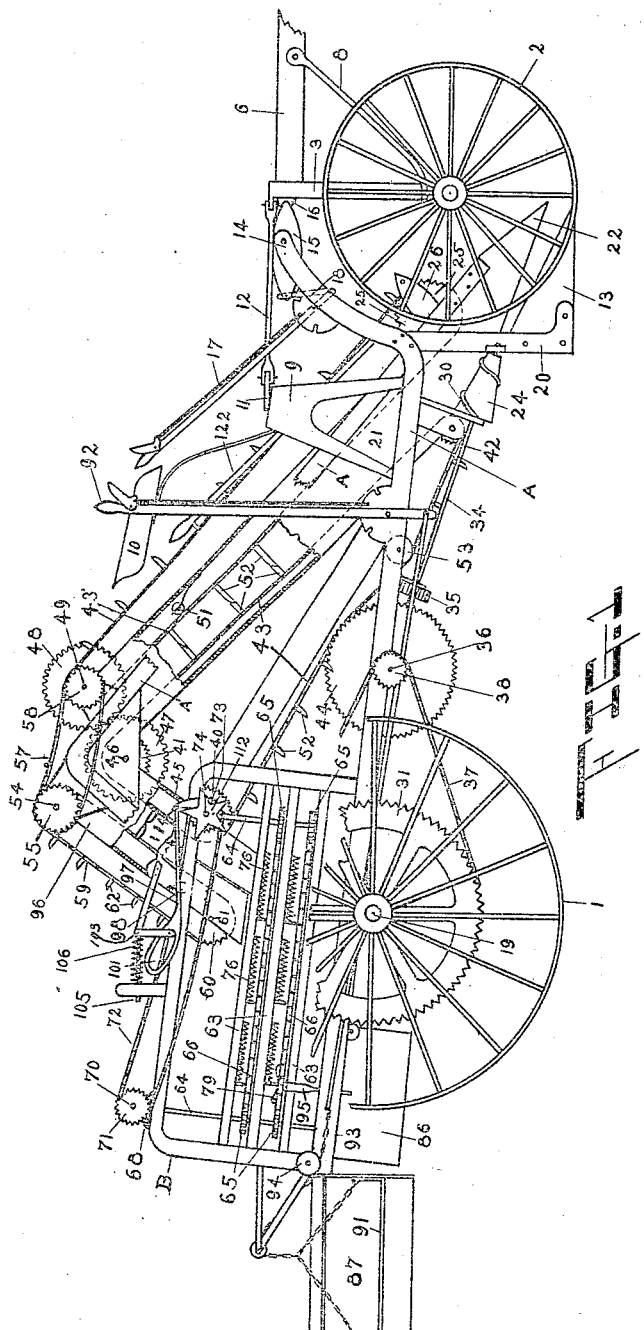
WITNESSES:
J. Ray Abbey.
Ralph E. Warfield.
INVENTOR
William B. Fox
BY
Geo. B. Willcox
ATTORNEY

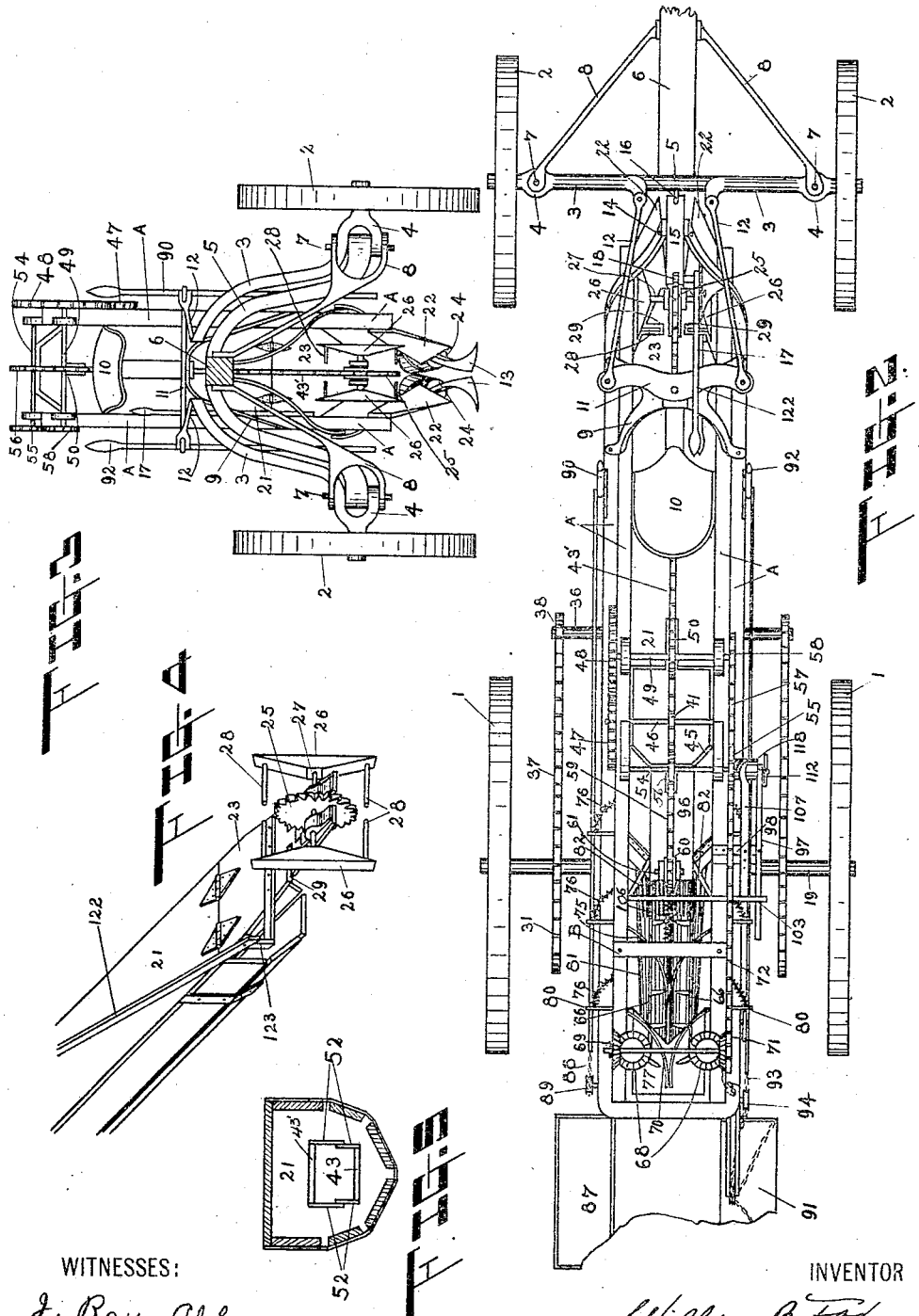

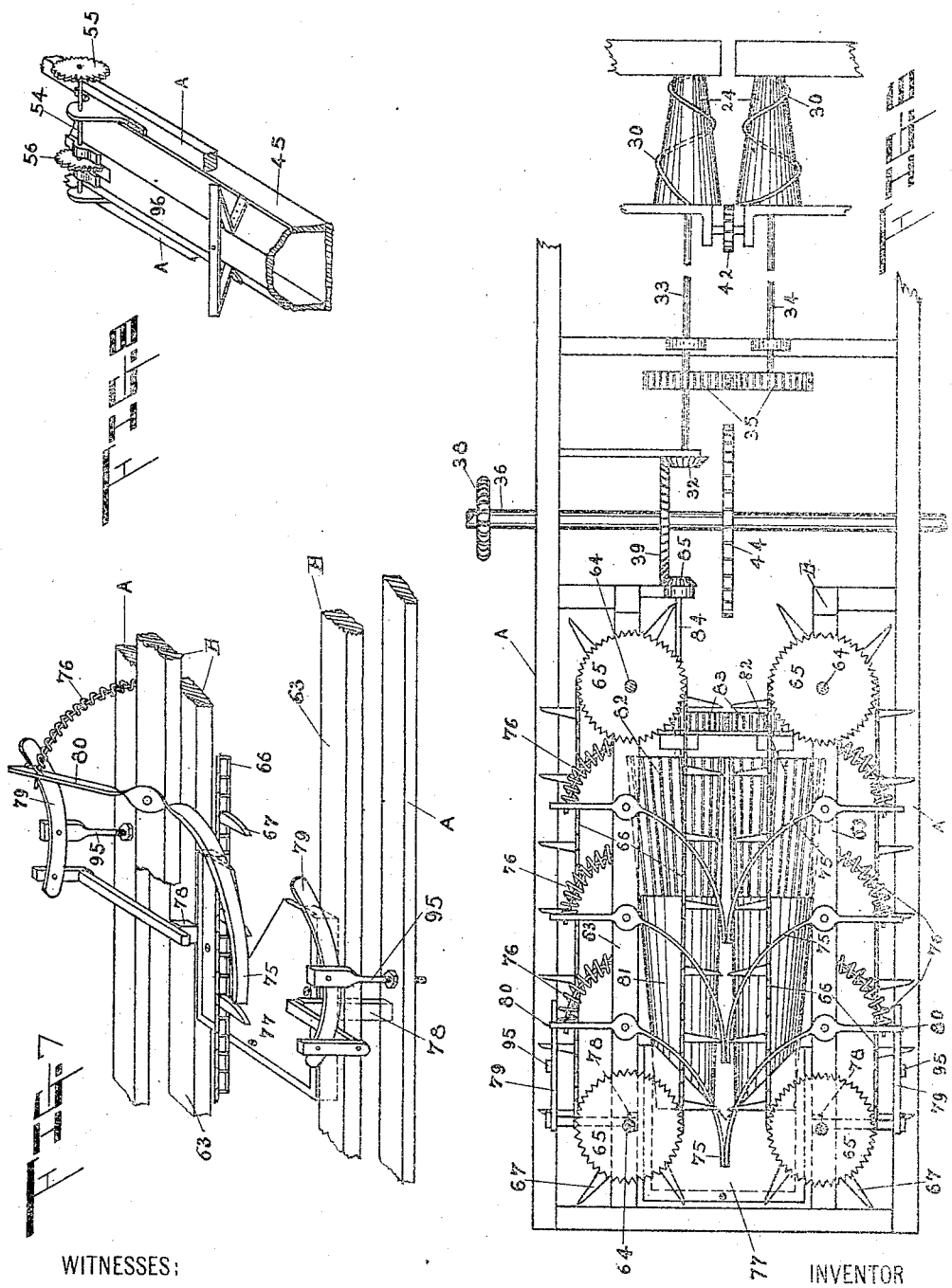

No. 890,585. PATENTED JUNE 9, 1908.
W. B. FOX.
BEET HARVESTER.
APPLICATION FILED AUG. 17, 1906.
4 SHEETS—SHEET 4.
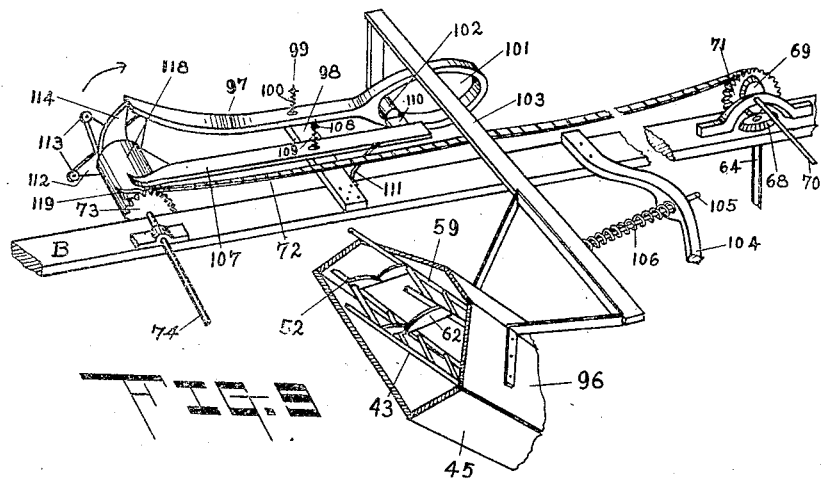
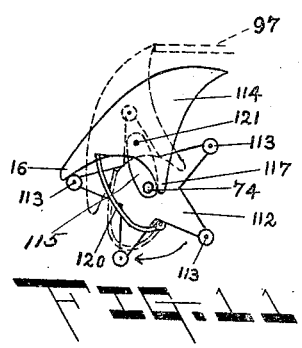
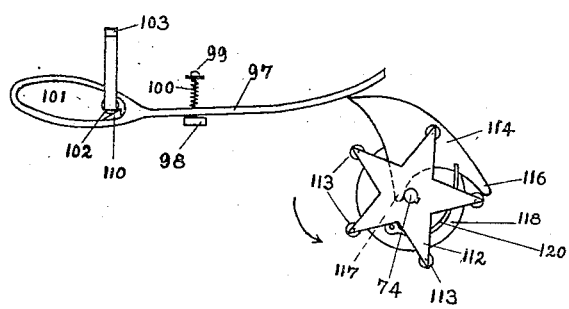
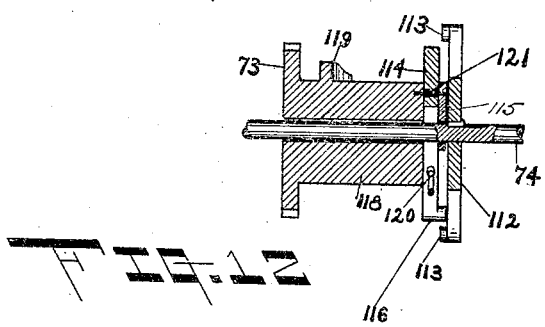
WITNESSES:
J. Ray Abbey
Joseph S. Warfield
INVENTOR
William B. Fox
BY
Geo. B. Willcox
ATTORNEY

UNITED STATES PATENT OFFICE.

WILLIAM B. FOX, OF BRECKENRIDGE, MICHIGAN.

BEET-HARVESTER.

No. 890,585.   Specification of Letters Patent.   Patented June 9, 1908.

Application filed August 17, 1906. Serial No. 331,001.

*To all whom it may concern:*

Be it known that I, WILLIAM B. FOX, a citizen of the United States, residing at Breckenridge, in the county of Gratiot and State of Michigan, have invented certain new and useful Improvements in Beet-Harvesters; and I do hereby declare the following to be a full, clear, and exact description of the invention, such as will enable others skilled in the art to which it appertains to make and use the same.

My invention relates to harvesting machines, and more particularly to beet harvesting machines, though it is also capable of use for harvesting other root crops as well.

Manufacturers of beet harvesting machinery have proceeded along divergent lines, one class preferring to "top" the beet prior to pulling it, while the other class utilize the top for pulling the beet, after which the top is removed.

In my invention, I depart from both forms, since the top is left on the beet until after it is pulled and yet I do not use the top in pulling the beet. It is not feasible to top the beets prior to pulling, since the top of the roots may be just below or some distance above the ground and an operator must continually adjust the cutter to each beet as he approaches it. Naturally this is impracticable and as a result many beets are either not topped at all or else a large slice of the root itself is removed with the top.

One object of my invention is the provision of means for uprooting the beets from beneath by means of plows.

A further object of my invention is the provision of novel means for conveying the uprooted beets to the cutters and for presenting the beets to the conveying means tops foremost.

A still further object of my invention is the provision of an automatically adjusted cutter, whereby the beet itself sets the cutter at the desired point for severing the top from the root.

Still a further object is the provision of a tripping mechanism automatically operated by the passage of a beet for causing the intermittent actuation of the topping mechanism and coöperating parts.

Still another object is the provision of separate means for receiving the tops and roots and for depositing them from time to time.

My invention further consists in certain other novel features and combinations of parts together with their equivalents, such as will be more fully disclosed hereinafter and particularly pointed out in the claims.

In the accompanying drawings, Figure (1) is a side view of my invention; Fig. (2) is a top plan view thereof; Fig. (3) is a front elevation; Fig. (4) is a detail perspective view of the forward inclined channel; Fig. (5) is a detail view in cross section of the channel; Fig. (6) is a top plan view of the topping mechanism and connected parts, certain elements being removed to better disclose the mechanism; Fig. (7) is a detail perspective view of the knife and coöperating parts; Fig. (8) is a detail perspective view of the rear inclined chute; Fig. (9) is a perspective detail view of the trip mechanism alone; Fig. (10) is a side view of the star wheel and stop rod; Fig. (11) is a detail view of the star wheel and catch taken from the side opposite to that shown in Fig. (10); and Fig. (12) is a detail view in cross section of the roll, star wheel and connected parts.

The drawings merely disclose one of a number of embodiments in which my invention may be incorporated, and referring to such drawings, (A) indicates any suitable framework supported by the rear driving wheels (1) (1) and the front wheels (2) (2). These front wheels are each journaled on the lower ends of the curved arms (3) (3) having a knuckle (4) formed at their lower ends, as shown in Fig. (3), the knuckles adapted to receive the ends of an inverted U-shaped axle (5), to which the rear end of the tongue (6) is secured. Pivot pins (7) (7) pass through the knuckles and the lower ends of the axle (5) to loosely connect the arms and axle and braces (8) (8) extend between the knuckles and the tongue to strengthen and support the latter.

A spider (9) is mounted on the frame (A) near the forward end thereof, a seat (10) being supported by the spider, and to this spider is pivotally secured a foot-bar (11) extending transversely of the frame, the opposite ends of the foot-bar being connected by means of links (12) (12) to the upper ends of the arms (3) (3). The object of this construction is to enable the operator to guide the machine proper relative to the beet rows, which are generally somewhat crooked even though the beets have been drilled, and it is plainly obvious that unless the machine is made flexible so that it can follow the rows, a large number of beets will be injured by the plows or else will not be gathered. The operator, seated on the seat (10) places his feet on the pivoted foot-bar (11) and can easily and quickly guide the machine so as to bring the successive beets directly between the plows or lifters (13) (13), hereafter set forth.

It is quite evident that an inoperative machine will result if there is no means for raising and lowering the lifters as when traveling from place to place on the road or upon arriving at the end of a row of beets, the machine, of course, traveling back and forth across the field. In order, therefore, to permit the lifters to be raised above the level of the ground, I preferably form the forward end of the frame into a gooseneck (14) and between the side-bars of the frame at the head of the gooseneck, I pivot a rocking lever (15) intermediate its ends, the forward end of the lever being loosely connected in any suitable manner, as by a staple (16), to the rear end of the tongue. A hand lever (17) is pivoted to the frame below the lever (15) and in position to be readily operated by the driver in seat (10), one end of the lever being connected by a link (18) to the rear end of the rocking lever (15). From this, it will be seen that the weight of the forward end of the frame and the parts carried thereby is loosely connected to the rear end of the tongue by means of the staple (16), but when the lifters are in the ground, they will assist in supporting the weight of the frame, relieving the staple of a strain and the staple is strong enough to support the weight when the machine is being transported from place to place or being turned at the end of a row.

In order to lift the forward end of the frame, which is journaled on the rear axle (19), the driver will grasp the lever (17) and force it downward, thereby thrusting upward on the link (18) and rocking the rear end of the rocking lever (15) upward to raise the forward end of the frame, which carries the lifters. A reverse movement of the lever (17) lowers the forward end of the frame and lifters, any suitable mechanism being provided to lock the lever (17) and the frame in their adjusted positions. It is evident also that by manipulating this lever, the depth to which the levers will descend when in operation may be regulated.

The lifters (13) are located at the lower ends of standards (20) (20) depending from the frame (A), and such lifters may be of any suitable form, but I preferably provide the pair of lifters shown which incline rearwardly from point to heel and are so positioned that the space between the lifters is constricted from point to heel as well.

The plan of operation of my invention is as follows: The lifters are caused to enter the ground a suitable distance on opposite sides of the row of beets and as the machine moves forwardly the lifters pass beneath the widest diameter of the roots of the beets and gently raise the roots out of the ground. If the beet sets deep in the ground, the forward portion of the lifters will engage the root and cause the latter to rise vertically out of the soil on account of the increased incline of the lifter. Of course, where the beet sets high, it will not be engaged by the lifter until the points have passed some distance beyond the beet. Directly behind the lifters are a pair of rolls, onto which the beets fall with their tops extending rearwardly, the tops having been gathered and bunched by suitable means located directly above the lifters. The tendency of the beets is to fall rearwardly, but where a beet is small, or for other causes, it might sometimes fall forwardly, to obviate which, I provide a beater, which thrusts the tops rearwardly, insuring that the beet will fall in the right direction. From the rolls, the beet is conveyed, top foremost, first upwardly and rearwardly and thence downwardly to the topping mechanism comprising a second pair of rolls, between which the top is caught and drawn down so that the head of the root rests directly on the rolls. A conveyer passes the beet still in this position to an automatically adjusted cutter, by which the top is separated from the root, the top and root being discharged into separate receptacles, which are emptied from time to time.

The topping mechanism is normally stationary, the passage of a beet through the conveyer being necessary to set it in motion. Hence, there is no lost or wasted power when no beets are being conveyed.

To return to the construction of the machine, the frame supports a chute (21) which extends rearwardly and upwardly from a point just behind the rolls (24), the lower forward end of the chute being open to receive the beets. To the forward end of the top of the chute is hinged a lip (23), the free end of which lip has a sprocket wheel (25) journaled therein, as shown in Fig. (4). A pair of diverging guides (22) (22) are secured to the frame at a point just above the lifters (13) (13), the guides being inclined rearwardly, their lower forward ends or points lying just at the surface of the ground, whereby to catch and embrace all the leaves of the top which often spread over the ground in all directions, the leaves being gradually straightened and bunched as the machine moves forwardly. The forward open end of the chute lies some distance behind the guides, the hinged lip (23) projecting in advance of the chute and lying above the rear ends of the guides (22) (22). The forward end of the lip is reduced, as shown, to provide space for the rotary beaters (26) (26) carried on the ends of the shaft (27) of the sprocket (25). The beaters may preferably consist of members located at opposite ends of the shaft (27), and extending transversely relative thereto, the members each having transversely projecting pins (28) (28) extending parallel with the shaft (27), as shown in Fig. (4), and the lip is recessed, as at (29), to permit the pins to pass therethrough. The hinged lip and beaters are adjustable to different heights of tops by means of the lever (122), to which the lip is connected by means of a link (123).

With the possible exception of the cover, which may be solid, as shown, the bottom and sides of chute 21 are formed of slats spaced apart from each other, as shown in Figs. (4) and (5), to permit any soil adhering to the beets to drop through the chute as the beets are conveyed therethrough.

Just below the hinged lip (23) are the conical rolls (24) (24), the space between which being constricted as shown in Fig. (6), the rolls being set at an incline to the horizontal and having the spiral ribs (30) (30) extending peripherally thereon. These rolls form a continuation of the incline of the lifters, the points of the rolls lying adjacent the heels of the lifters and the space between the rolls is designed to permit the dirt and stones raised by the lifters with the beet, to be dropped back onto the ground, without passing through the machine.

The rear axle carries the drive gears (31) (31), which communicate motion to a counter shaft (36) by means of sprocket chains (37) passing over the gears (31) (31) and over the sprockets (38) on the countershaft, which in turn carries a bevel-gear (39) meshing with a bevel-gear (32) on shaft (33), the shaft (33) being suitably journaled in the frame beneath the conveyer chute, and having one of the conical rolls (24) secured thereon at its forward end. A shaft (34) suitably journaled in the frame carries the other conical roll (24), shafts (33) and (34) bearing the intermeshing gears (35), whereby the rolls are caused to rotate toward each other.

I am aware that heretofore conical rolls with spiral grooves have been used, but the ribs project above the surfaces of the rolls and actually engage and force the beet upward along the rolls, whereas the grooves lack this function and furthermore lose whatever utility they may possess by becoming filled with clay and soil.

The sprockets (40), (41) and (42) occupying a triangular relation to each other and journaled in the frame are adapted to support the lower of the drive or conveyer chains (43), sprocket (41) being located at the apex of the frame, such chain (43) passing over a gear-wheel (44) on countershaft (36) from which it derives its motion, the chain passing upward through the slotted conveyer chute (21) and over sprocket (41), after which the chain passes down through a tripping chute (45) and thence around sprocket (40), over gear (44) and around sprocket (42), the latter being located at the forward end of the machine at the mouth of chute (21). The sprocket (41) is carried by a shaft (46), on which is secured a gear (47) meshing with a gear (48) on shaft (49) located above the upper end of chute (21), the shaft (49) carrying a sprocket (50), around which passes the remaining chain (43') of the conveyer, chain (43') passing downward outside the chute (21) and over sprocket (25) on the hinged lip (23) and thence upward through chute (21), a pressure roller (51) within the chute bearing on the chain (43') to hold it down. These conveyer chains are each arranged to travel together and are provided each with a series of fingers (52) (52), the fingers on the upper chain (43') adapted to take over or embrace the fingers on the lower chain, in the manner shown in Figs. (1) and (5). The lower chain (43) is also engaged by a tightening sprocket (53) to cause it to positively engage the teeth of the gear (44). The fingers project from the opposite sides of the chains (43) (43') so as to avoid contact with the sprockets over which the chains pass, and it is the function of the pressure roller (51) to hold the fingers in the telescoped position, shown in Fig. (5).

The operation of this part of my invention is as follows: The beet having been raised out of the ground, by the lifters (13) (13) and having their tops bunched during such lifting process by the bunching guides (22) (22), is engaged by the beaters (26), which by contact with the bunched tops operate to throw the tops rearwardly the roots being supported by the conical rolls (24) (24). It will be observed that the beaters and sprocket wheel (25) are located above and in advance of the sprocket (42), which is situated just in the rear of the rolls (24), so that the bunched tops are engaged and held in constricted position by the fingers (52) before they leave the bunching guides (22), the rear ends of which are located beneath the sprocket (25). When the root engages the rolls (24), it is caught by the peripheral spiral ribs (30) and forced rearwardly, the bunched tops extending toward the rear of the machine and being confined by the fingers (52) of the upper chain (43'). As the fingers of the upper chain reach the rear ends of the rolls, a set of fingers on the lower chain arrive and mesh between the fingers of the upper chain, the root being transferred from the rolls (24) to the chains between which it lies and by which it is gripped and carried up the chute (21) and down into the tripping chute (45). The upper chain (43') leaves the beet at the upper end of the inclined chute (21), but the lower chain continues on through the down chute (45).

A shaft (54) is journaled at the upper end of the down chute, said shaft carrying a gear (55) and a sprocket (56), a drive chain (57) passing over gear (55) and over a second gear (58) on shaft (49), whereby motion is imparted to an upper drive chain (59) passing around sprocket (56) and a sprocket (60) on shaft (81) carried at the lower end of the cover of the down chute (45). The chain (59) is provided with fingers (62) telescoping over the fingers (52) of the chain (43) as before described, the chains (43) (43') and chain (59) all running together and constituting a conveyer for the roots and tops. The upper open ends of chutes (21) and (45) lie adjacent each other, as shown in Fig. (2), the lower end of the chute (45) discharging the beets, tops first, into a topping conveyer shown in Fig. (6). This topping conveyer is supported above the rear axle (19), as shown, and preferably comprises a frame (B) extending longitudinally of the machine and equipped with the side bars (63), which may be three in number on each side, as shown in the drawings. Vertically extending shafts (64) (64) occupy the four corners of and are journaled or stepped in the frame, the shafts carrying sprockets (65) (65) located between each two side bars, chains (66) connecting the sprockets on each side of the machine. Thus I provide four chains extending longitudinally of frame (B), the two pairs of chains on opposite sides lying in the same respective horizontal planes and being provided with the fingers (67) which project toward, but do not quite engage each other. The upper ends of the rear shafts (64) are provided with gears (68) adapted to mesh with gears (69) carried on a cross shaft (70), likewise having a sprocket (71), around which passes a chain (72) the chain also encircling a sprocket (73) mounted on a shaft (74), the shaft (74) also having the sprocket (40) thereon, by which the shaft is driven. The sprocket (73) is loose on the shaft (74), but is provided with clutch mechanism, hereinafter described, for releasably locking it to the shaft. From the foregoing, it will be seen that the chains (66) are given a movement whereby the adjacent plies of opposite chains move together.

Just above each opposite pair of chains are located the spring actuated blades (75) (75) pivotally secured intermediate their ends to the side bars (63) between the pairs of forward and rearward shafts (64) (64), the blades being of any suitable width or of varying widths and composed of some resilient material. These blades project toward each other and may be as long as or longer than the width of the frame (B), the free ends of the blades on one side of the frame being bent rearwardly and adapted to contact with the correspondingly bent blades on the opposite side of the frame, as shown in Fig. (6). The outer ends of the blades are engaged by springs (76), whereby the inner rearwardly extending ends of the blades are held yieldingly pressed together. It will be understood that there are two or more banks of these blades so spaced apart as to engage the beet root and retain it in a vertical position.

Located near the rear end of the frame (B) and at a point approximately between the rear pair of shafts (64) (64) is a horizontally disposed knife (77), the opposite sides of which are secured to vertically extending slides (78) (78) loosely mounted in the frame (B) beneath the lowest of the pair of chains (66) (66). The slides may be angular in cross section and are preferably secured to the rear ends of suitably supported curved levers (79) (79). The outer ends or tails (80) (80) of the lower rearmost pair of blades engage the curved levers to automatically raise or lower the knife, as hereinafter set forth.

Directly beneath the lower chain (66) and extending longitudinally of the frame (B) are the conical topping rolls (81) (81) located side by side, the forward ends of the rolls being corrugated, as at (82) (82). The space between the rolls gradually widens from front to back, as shown, the corrugated portions of the rolls being the closest together. These rolls are suitably journaled in frame (A) beneath frame (B), the rolls carrying the intermeshing gears (83), whereby the rolls are driven in opposite directions, one of the rolls being driven by means of a shaft (84) equipped with a gear (85) meshing with gear (39) on shaft (36).

The operation of this portion of my machine is as follows: The beets are delivered, tops first, from chute (21) into the upper end of chute (45), down which the beets are carried by the main or drive chain (43) and the upper chain (59). The chute (45) discharges the beets down upon the corrugated portions of the rolls, the tops engaging the rolls first and being caught thereby and drawn firmly down between the rolls, which bite off a great part, if not all of the leaves, leaving the head of the root upside down upon the rolls, which, owing to the bulge of the head, can not draw that in. The fingers (67) on chains (66) (66) engage the root and move it rearwardly toward the knife, this being made possible because the grip of the rolls on the beet top is intermittent and it is quite easily slid along on the rolls toward the tapering rear ends thereof. The spring actuated blades (75) retain the root in vertical position as it moves rearwardly, the blades moving apart when engaging the root and closing together after the root has passed between the contacting inner ends thereof. Not only does this maintain the root in vertical position and prevent it from falling, but it also loosens any dirt which may still adhere to the beet and the blades may be of varying widths to accomplish both purposes. Also the fact that the leaves are drawn down by the rolls causes the butt of the beet to rest on the rolls and operates to maintain the root in upright position. As the root passes between the last and lowest pair of blades (75) it forces them apart, thereby moving the tails (80) (80) against the tension of the springs (76) (76) and over the curved levers (79) (79) to rock the latter, thereby raising the knife to the exact height to sever the top from the root, the top dropping into a suitable box (86) beneath the knife while the root is carried across the knife by the carrier chains (66) and is discharged into a receptacle (87) at the back of the machine.

It will be seen that the normal position of the knife is at its lowest limit of movement, so that a small root will not raise the knife as high as a large root.

The box (86) may be pivotally supported in any suitable manner, a connection (88) being fastened to the free end of the box and thence passed over an idler (89) to a lever (90) near the driver's seat (10), whereby to permit the driver to empty the box of the leaves and tops at will. The receptacle (87) is provided with an open end, which is closed by an end gate (91) controlled by a lever (92) and a flexible connection (93) passing under an idler (94) and connecting the end gate to one end of a rod whose forward end is secured to the lever to permit the driver to dump the contents of the receptacle from time to time.

It will be observed that I have devised a new method of gathering and topping beets. In those machines which top the beet prior to harvesting, the cutter may take the leaves off several inches above the roots or will cut a portion of the root off with the tops and when the roots are subsequently plowed up, a large amount of the crop will be covered by the loose earth plowed up, and lost. This method of harvesting the beets possesses other disadvantages as well. In those machines which grasp the top of the beet and pull it, the beets subsequently being conveyed by the gripping chains to a cutter, the same disadvantages first mentioned arise, namely, that the cutter will leave some inches of top on one beet while the next will be cut in two through the root. My machine, however, is adapted to harvest any beet, no matter how peculiarly it grows, and convey it, top first, to the topping mechanism, onto which it is discharged and by which it is evenly topped owing to the fact that I draw all the leaves down, between the rolls and thus provide a base upon which to operate, since every beet, no matter what its size or shape, must rest, butt downward, on the rolls before it is cut, the rolls being driven at a high speed to quickly take in the leaves of the top.

The positions of the various parts may be adjusted as appears desirable. Thus, for instance, the lever supports, (95) (95) may be adjusted up or down to hold the knife at various heights.

The topping rolls (81) (81) rotate continuously, but the carrier chains (66) (66) are stationary except when a beet is passing through. One object of this is to economize power as much as possible, but the principal reason is to prevent the beet from being carried so quickly toward the knife that the leaves will not all have been gathered in by the topping rolls. In other words, the rolls must be given time in which to draw in the tops and to this end, I provide a suitable locking and tripping mechanism, one embodiment of which is shown in the drawings.

The cover (96) of the chute (45) is pivotally hinged at its upper end, as for instance, on the shaft (54), in such a manner that it can swing rearwardly, the shaft (61) being also mounted on the cover to swing therewith. The beets, as they pass through the down chute, are adapted to swing its lower end rearwardly. Mounted on frame (B) laterally of the chute (45) is a stop lever (97), adapted to rock on its support (98), to which it is secured by a pin (99), a spring (100) being carried by the pin and engaging the stop lever to retain its forward end normally in lowered position. The rear end of the stop lever may be curved, but I prefer to form an elliptical aperture (101) therethrough, the forward end of which aperture is normally occupied by a roll (102) carried at one end of a laterally projecting bar (103) secured to the swinging cover (96). A bracket (104) projecting from the frame (B) serves as a guide for a pin (105) mounted on the bar (103) and passing through the bracket, a spring (106) encircling the pin and bearing against the bar to return the cover (96) to its normal position and also for the purpose of normally holding the bar with its roll at the forward end of the aperture. A trip lever (107) is also pivotally mounted intermediate its ends on the support (98), a pin (108) passing through a slot in the trip lever to allow it to rock vertically on the support, a spring (109) encircling the pin and pressing against the trip lever to normally hold it in horizontal position. The trip and stop levers are substantially parallel, a laterally projecting wedge (110) being carried by the rear end of the trip lever, the outer end of the wedge adapted to lie against the inner end of the roll (102) and being pressed thereagainst by means of a spring (111) engaging the trip lever. So long as the roll remains in the position shown in Fig. (9), the wedge is retained outside the aperture (101) in the stop lever (97). The shaft (74) has keyed thereto a star-wheel (112), the points of which may be equipped with projections (113) adapted to engage one lug (116) of a trip (114) loosely connected to shaft (74) by means of a link (115), the opposite lug (117) adapted to engage the shaft (74) when lug (116) has been engaged by a projection (113) of the star, whereby to limit the pivotal movement of the trip and permit the latter to be rotated by the star-wheel. The upper end of the trip is adapted to be engaged by the forward end of the stop-lever (97). Loosely journaled on shaft (74) is a sleeve (118), by which sleeve the sprocket (73) is carried, the sleeve having a cam (119) located exteriorly thereof, the forward end of the trip lever (which may be curved as shown) lying in position to be engaged by the cam (119) when the sleeve is rotated. A spring (120) secured to the end of the sleeve engages the trip and normally tends to throw the lug (116) into the path of movement of the projections (113) of the star-wheel, the trip being pivoted on a pin (121) projecting from the end of the sleeve. In Fig. 11, the full lines denote the positions of the parts when the lug (116) has been forced by spring (120) into the path of movement of the projections on the star-wheel, the dotted lines denoting the positions of the parts when the trip is engaged and held by the stop-lever. Fig. (10) shows the positions of the parts from the side opposite to Fig. 11 when the stop-lever releases the trip.

This operation of this part of the mechanism is as follows: A beet passes down through chute (45) and in passing swings the cover (96) rearward against the tension of spring (106), the movement of which carries the bar (103) and roll (102) backwardly with it, whereupon the tension of spring (111) against the rear portion of trip lever (107) swings the latter horizontally so as to force the inclined member (110) into the slot (101) and simultaneously move the forward curved end of the lever (107) into the path of movement of the cam ridge (119). Normally the curved free end of the lever (107) is out of the path of movement of the cam. The beet has now passed out of the chute and has been deposited, top first, upon the rapidly rotating rolls (81), the carrier chains (66) (66) remaining stationary, the rolls operating to draw down between them the leaves of the top. The cover (96) is now swung forwardly to its normal position by its own weight assisted by the spring (106), carrying the bar (103) and roll (102) therewith, the roll riding up over the inclined member (110), and by reason of the fact that the bar and roll will not yield, the rear end of the stop-lever (97) is depressed, thereby elevating the forward end of such lever to release the trip (114), whereupon the spring (120) forces lug (116) into the path of movement of the continuously rotating star-wheel (112) to cause one of the projections (113) to engage the lug (116) and rotate the trip, sleeve, and sprocket (73). The rotation of the sleeve causes the cam ridge (119) to engage the curved forward end of the trip lever and swing the lever back to its original position against the tension of spring (111). Such movement of the lever operates to move the inclined member (110) from the slot (101), thereby permitting the stop-lever to regain its normal position, its rear end being elevated to the position shown in Fig. (9), by the spring (100). The engagement of the cam and trip-lever occurs shortly after the stop-lever has been rocked by the return of the roll (102) so that the forward end of the stop-lever is returned to its normal position prior to the complete rotation of the trip, sleeve and sprocket wheel. Also it will be seen that the trip lever (107) has been rocked downward with the stop-lever (97) as the roll rides over the inclined member (110). As the trip completes its rotation the forward end of the stop lever meets it and moves it forward against the tension of its spring (120), the disk like projection (113), each of which is journaled on the arms of the star-wheel rolling around the circular lug (116) to release itself therefrom. Of course, as the sprocket (73) rotates, it drives the carrier chains (66), which operate to carry the beet forward one step, after which the chains and beet remain stationary until a succeeding beet passes through the chute (45) and causes the further operation of the carrier chains, the beets being carried toward the knife, step by step in this manner. (I may use a stationary instead of a movable knife.)

From the foregoing it is evident that I have provided a complete machine for raising, conveying and topping beets or other root vegetables easily and rapidly, that I have also provided means for steering the harvester along the rows of beets and for raising and lowering the lifters at the end of a row or when traveling toward and from the field, and it is obvious that many changes might be made in the form and arrangement of the various parts described without departing from the spirit and scope of my invention, and hence, I do not wish to limit myself to the exact construction herein set forth.

Having thus fully disclosed my invention, what I claim as new is:

1. A topping mechanism comprising a pair of normally stationary rolls, a carrier for feeding the vegetables head first to the rolls, tripping mechanism associated with the carrier and operated by the passage of a vegetable along the carrier, a clutch operated by the tripping mechanism for setting the rolls in motion, a cutter, and means for conveying the beet to the cutter.

2. A harvester comprising a pair of lifters, topping mechanism, the topping mechanism comprising a pair of rotating rolls, conveying means for receiving the vegetables lifted and discharging them, tops first, onto the rolls, a cutter and carrier chains for moving the vegetables toward the cutter.

3. A harvester comprising lifters, topping mechanism comprising a pair of continuously rotating rolls, conveying means for receiving the vegetables lifted and for discharging them, tops first, onto the rolls, a cutter, carriers for conveying the vegetables toward the cutter, driving mechanism for the carriers, and a trip mechanism controlled by the passage of the vegetables for permitting the intermittent actuation of the carriers.

4. A harvester comprising lifting members, conveying means for receiving the vegetables lifted, a topping mechanism, onto which the vegetables are discharged from the conveyer, the topping mechanism comprising continuously rotating rolls, a cutter, carriers for bringing the vegetables to the cutter, and means operated by the passage of the vegetable for automatically adjusting the cutter.

5. A harvester comprising lifting members, conveying means for receiving the vegetables lifted, a topping mechanism, onto which the vegetables are discharged from the conveyer, the topping mechanism comprising continuously rotating rolls, a cutter, carriers for bringing the vegetables to the cutter, driving mechanism for the carriers, a trip mechanism actuated by the passage of a vegetable for permitting the intermittent actuation of the driving mechanism, and supports for the vegetables while engaging the rolls.

6. A beet harvester comprising lifters, conveying mechanism, topping mechanism, to which the conveying mechanism leads, bunching guides located above the lifters, and means for causing the beets to fall, tops rearwardly, on the topping mechanism.

7. A beet harvester comprising lifters, conveying mechanism and topping mechanism, to which the conveying mechanism leads, the topping mechanism consisting of a pair of oppositely rotating partially corrugated frusto conical rolls, carrier chains arranged above the rolls, yielding supporting members interposed between and above the carrier chains and a cutter to which the beets are fed.

8. A beet harvester comprising lifters, conveying mechanism, and topping mechanism, to which the conveying mechanism leads, the topping mechanism consisting of means for drawing down and biting off the tops, a cutter and means for feeding the beet toward the cutter.

9. A beet harvester comprising lifters, conveying mechanism and topping mechanism, to which the conveying mechanism leads, the topping mechanism consisting of means for drawing down and biting off the tops, a cutter and means for feeding the beet, step by step, toward the cutter.

10. A beet harvester comprising lifters, conveying mechanism, and topping mechanism, to which the conveying mechanism leads, the topping mechanism consisting of continuously operating means for drawing down and biting off the tops, a cutter, and means for feeding the beet, step by step toward the cutter.

11. A beet harvester comprising lifters, conveying mechanism and topping mechanism, to which the conveying mechanism leads, the topping mechanism consisting of a continuously operating means for drawing down and biting off the beet tops, a fingered carrier mechanism, a cutter toward which the carrier mechanism forces the beet, and yielding supports between which the beet passes.

12. A beet harvester comprising lifters, conveying mechanism and topping mechanism, to which the conveying mechanism leads, the topping mechanism consisting of a continuously operating means for drawing down and biting off beet tops, a fingered carrier mechanism, a cutter toward which the carrier mechanism forces the beet, flexible blades projecting toward and engaging each other and springs engaging the tails of the blades to yieldingly retain the blades in contact with each other.

13. A beet harvester comprising lifters, conveying mechanism and topping mechanism, to which the conveying mechanism leads, the topping mechanism consisting of a continuously operating means for drawing down and biting off beet tops, a fingered carrier mechanism, a cutter toward which the carrier mechanism forces the beet, oppositely located movable guides, to which the knife is secured, curved levers connected to the guides, a pair of flexible blades, the inner ends of which meet and abut over the knife, springs connected to the tails of the blades to hold the inner ends in yielding contact, the tails adapted to engage the curved levers as a beet passes between the inner ends of the blades to automatically adjust the knife to each beet passing between the blades.

14. A beet harvester comprising lifters, conveying mechanism and topping mechanism, to which the conveying mechanism leads, the topping mechanism consisting of continuously operating means for drawing down the beet tops, a carrier, a cutter, to which the beets are fed by the carrier, and means for retaining the beets in upright position.

15. A beet harvester comprising lifters, conveying mechanism and topping mechanism, to which the conveying mechanism leads, the topping mechanism consisting of continuously operating means for drawing down the beet tops, a carrier, and a cutter, to which the beets are fed by the carrier.

16. A beet harvester comprising lifters, conveying mechanism, and topping mechanism, to which the conveying mechanism leads, the topping mechanism consisting of continuously operating means for drawing down the beet tops, a carrier, a cutter, to which the beets are fed by the carrier, driving means for the carrier and an automatically operated clutch mechanism controlling the actuation of the driving mechanism.

17. In a beet harvester, the combination with a conveyer, of a hinged cover engaged by the passage of the beets, a bar connected to and movable with the cover, a spring for yieldingly retaining the cover in normal position, a roll carried by the bar, a stop-lever slotted at one end, the roll normally lying at one end of the slot, a trip engaged by the opposite end of the stop-lever, a drive-shaft, a sleeve and sprocket loose on the shaft, a link journaled on the shaft, a pin connecting the trip, link and sleeve, lugs on the trip, a star wheel fast on the shaft, rolls on the starwheel adapted to engage one of the lugs on the trip, the opposite lug adapted to lie against the shaft and limit the movement of the trip in one direction, a spring for throwing one of the lugs of the trip into the path of movement of the rolls on the star wheel, a trip lever adapted to have a pivotal and laterally swinging movement, an inclined member on the trip lever, means for swinging the trip lever to cause the inclined member to supercede the roll on the bar in the slotted stop lever when the cover is swung against the tension of its spring, the carrier mechanism connected with the sprocket, and a cam on the sleeve adapted to engage the trip lever and swing it laterally to permit the stop lever to engage the trip.

18. In a beet harvester, a topping mechanism comprising means for drawing down the tops, a cutter, carrier mechanism for feeding the beets to the cutter, a driving shaft connected with the carrier mechanism, a clutch mechanism on the shaft, and a trip mechanism actuated automatically by the passage of the beets toward the topping mechanism to intermittently throw in the clutch to actuate the carrier mechanism.

19. In a beet harvester, a topping mechanism comprising means for drawing the tops down, a cutter, carrier mechanism for moving the beets toward the cutter, a driving shaft for the carrier mechanism, a clutch mechanism on the shaft, a trip mechanism coöperating with the clutch mechanism, and a swinging member automatically actuated by the passage of a beet toward the topping mechanism for intermittently actuating the trip mechanism to throw in the clutch and cause the beets to move, step by step toward the cutter.

20. In a beet harvester, a topping mechanism comprising means for drawing the tops down, a cutter, a carrier mechanism for moving the beets toward the cutter, a driving shaft for communicating motion to the carrier mechanism, a chute through which the beets pass to the topping mechanism, a hinged cover on the chute adapted to be moved by the passage of a beet through th chute, a bar carried by the cover, a roll on the bar, a sleeve and sprocket loosely journaled on the driving shaft, a chain connecting the sprocket and carrier mechanism, a star-wheel fixed on the shaft, a link loose on the shaft, a trip pivotally secured to the link and sleeve, a lug on the trip, means for normally throwing the lug into the path of movement of the star-wheel, means for limiting the movement of the trip, a rocking stop-lever mounted intermediate its ends, the forward end of the stop-lever normally engaging the trip to maintain its lug out of the path of movement of the star-wheel, a rocking and swinging trip lever, the roll on the bar normally engaging the rear end of the stop lever, an inclined member on the trip lever adapted to automatically assume the position occupied by the roll when the hinged cover is swung in one direction, the return of the cover to normal position adapted to cause the roll to ride upon the inclined member to cause the stop lever to release the trip and means on the sleeve adapted to engage the trip lever subsequent to the release of the trip and move said trip lever to withdraw the inclined member from beneath the roll and permit the stop lever to automatically return to its position in the path of movement of the trip.

21. A beet harvester comprising lifters, conveying mechanism, and topping mechanism, to which the conveying mechanism leads, the topping mechanism consisting of means for drawing down and biting off the tops.

22. A beet harvester comprising lifters, conveying mechanism, and topping mechanism, to which the conveying mechanism leads, the topping mechanism consisting of means for drawing down and biting off the tops, and means for drawing the vegetables out of the machine.

23. A beet harvester comprising lifters, conveying mechanism, and topping mechanism, to which the conveying mechanism leads, the topping mechanism consisting of continuously-operating means for drawing down and biting off the tops, and means for drawing the vegetables out of the machine.

24. A beet harvester comprising lifters, conveying mechanism and topping mechanism, to which the conveying mechanism leads, the topping mechanism consisting of means for drawing down and biting off the beet tops, a carrier, and means for retaining the beets in upright position as they are conveyed by the carrier.

In testimony whereof, I affix my signature in presence of two witnesses.

WILLIAM B. FOX.

Witnesses:
 GEO. S. ALDRICH,
 HARVEY B. HOLTON.